(12) United States Patent
Georgis et al.

(10) Patent No.: US 12,415,624 B2
(45) Date of Patent: Sep. 16, 2025

(54) THERMALLY EFFICIENT BUS HOUSING

(71) Applicant: Maxar Space LLC, Westminster, CO (US)

(72) Inventors: David Georgis, Boulder, CO (US);
Frederick Oey, San Carlos, CA (US);
Robert Helmer, Pleasanton, CA (US)

(73) Assignee: Maxar Space LLC, Westminster, CO (US)

( * ) Notice: Subject to any disclaimer, the term of this patent is extended or adjusted under 35 U.S.C. 154(b) by 312 days.

(21) Appl. No.: 17/939,290

(22) Filed: Sep. 7, 2022

(65) Prior Publication Data

US 2024/0076064 A1 Mar. 7, 2024

(51) Int. Cl.
*B64G 1/50* (2006.01)
*B64G 1/10* (2006.01)
*B64G 1/42* (2006.01)

(52) U.S. Cl.
CPC ............ *B64G 1/50* (2013.01); *B64G 1/428* (2013.01)

(58) Field of Classification Search
CPC ........................................ B64G 1/50
USPC .......................................... 174/520
See application file for complete search history.

(56) References Cited

U.S. PATENT DOCUMENTS

| | | | | |
|---|---|---|---|---|
| 4,331,830 A | * | 5/1982 | Conway | H05K 7/20236 174/12 R |
| 4,629,861 A | * | 12/1986 | Hibler, Sr. | B23K 9/0026 219/137 R |
| 4,928,031 A | * | 5/1990 | Linyaev | G01N 29/24 310/346 |

* cited by examiner

*Primary Examiner* — Timothy J Thompson
*Assistant Examiner* — Amol H Patel
(74) *Attorney, Agent, or Firm* — Pearl Cohen Zedek Latzer Baratz LLP

(57) ABSTRACT

An orbital satellite has a bus formed of a bus module and a payload module. Both the bus module and the payload modules may include a pair of panels integrally formed at an angle of for example 90° with respect to each other. Components and electronics supporting the satellite systems may be mounted on the panels of the bus and payload modules. Heat generated by the components and electronics are conducted between panels of the bus module and/or payload module. Sufficient heat transfer between panels occurs as a result of their being integrally formed with each other.

12 Claims, 10 Drawing Sheets

THERMALLY EFFICIENT BUS HOUSING

BACKGROUND

Satellite constellations orbit the Earth providing communication nodes for Earth's communications systems, as well as performing a variety of other functions. Satellites in general may include one or more payloads carried by a spacecraft (also known as a bus). In one example, the bus may be a cube-shaped structure including a bus module having first and second right angle panels including components and electronics, and a payload module having third and fourth right angle panels including components and electronics. The panels for both the bus and payload may be bolted together. Thereafter, the payload and bus modules may be affixed to each other and sealed with side panels to complete the construction.

The components and electronics on at least one panel of each of the bus and payload modules generate heat which needs to be dissipated to space to prevent overheating of satellite systems. It is desirable to conduct heat from one panel to the other in each of the bus and payload modules to increase the surface area available to radiate heat away from the satellite. In order to accomplish heat transfer between panels, it is known to provide a first set of heat pipes bonded between the first and second panels of the bus module, and a second set of heat pipes bonded between the third and fourth panels of the payload module. These first and second sets of heat pipes add to the time, complexity and cost of fabricating the satellite.

SUMMARY

In one aspect, the present disclosure relates to an orbital satellite having a bus module including first and second panels which are integrally formed with each other, and including a fillet at the interface between the first and second panels. Forming the first and second panels integrally with each other promotes heat conduction between the first and second panels resulting from components and/or electronics on one or both panels. Additionally or alternatively, the present disclosure relates to an orbital satellite having a payload module including third and fourth panels which are integrally formed with each other, and including a fillet at the interface between the third and fourth panels. Forming the third and fourth panels integrally with each other promotes heat conduction between the third and fourth panels resulting from components and/or electronics on one or both panels.

In one example, the present technology relates to a satellite, comprising: a bus comprising: a bus module, and a payload module, at least one of the bus module and the payload module comprising first and second panels integrally formed with each other at a non-straight angle to each other, the bus module and payload module configured to mate with each other to form sides of the bus, one or more of the first and second panels comprising structure, components or electronics generating heat, the integral formation of the first and second panels facilitating heat conduction between the first and second panels; and a payload affixed to the payload module.

In another example, the present technology relates to a bus for a satellite, comprising: a bus module, and a payload module, at least one of the bus module and the payload module comprising first and second panels integrally formed with each other at a non-straight angle to each other, the bus module and payload module configured to mate with each other to form sides of the bus, one or more of the first and second panels comprising structure, components or electronics generating heat, the integral formation of the first and second panels facilitating heat conduction between the first and second panels; a fillet formed at an interface where the first and second panels come together, the fillet increasing a thickness at the interface to increase the area available to conduct heat between the first and second panels.

In another example, the present technology relates to a bus for a satellite, comprising: a bus module comprising first and second panels integrally formed with each other at a non-straight angle to each other; a payload module comprising third and fourth panels integrally formed with each other at a non-straight angle to each other, the bus module and payload module configured to mate with each other to form sides of the bus, one or more of the first, second, third and fourth panels comprising structure, components or electronics generating heat, the integral formation of the first and second panels facilitating heat conduction between the first and second panels, and the integral formation of the third and fourth panels facilitating heat conduction between the third and fourth panels; a first fillet formed at a first interface where the first and second panels come together, the first fillet increasing a thickness of the bus module at the first interface to increase an area of the bus module available to conduct heat between the first and second panels; and a second fillet formed at a second interface where the third and fourth panels come together, the second fillet increasing a thickness of the payload module at the second interface to increase an area of the payload module available to conduct heat between the third and fourth panels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

In one aspect, technology is described for an orbital satellite having a bus formed of a bus module and a payload module. Both the bus module and the payload modules may include a pair of panels integrally formed at an angle with respect to each other. Components and electronics supporting the satellite systems may be mounted on the panels of the bus and payload modules. Heat generated by the components and electronics are conducted between panels of the bus module and/or payload module. Sufficient heat transfer between panels occurs as a result of their being integrally formed with each other. As such, heat transfer pipes of prior art modules may be omitted. In embodiments, a fillet may be formed at the interface between panels in the bus module and/or payload module to further facilitate heat transfer between the panels.

It is understood that the present technology may be embodied in many different forms and should not be construed as being limited to the embodiments set forth herein. Rather, these embodiments are provided so that this disclosure will be thorough and complete and will fully convey the technology to those skilled in the art. Indeed, the technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

The terms "longitudinal" and "transverse," "top" and "bottom," "upper" and "lower" and "vertical" and "horizontal," and forms and synonyms thereof, as may be used herein are by way of example and illustrative purposes only, and are not meant to limit the description of the technology inasmuch as the referenced item can be exchanged in position and orientation.

For purposes of this disclosure, a connection may be a direct connection or an indirect connection (e.g., via one or more other parts). In some cases, when a first element is referred to as being connected, affixed, mounted or coupled to a second element, the first and second elements may be directly connected, affixed, mounted or coupled to each other or indirectly connected, affixed, mounted or coupled to each other. When a first element is referred to as being directly connected, affixed, mounted or coupled to a second element, then there are no intervening elements between the first and second elements (other than possibly an adhesive or melted metal used to connect, affix, mount or couple the first and second elements).

Figure 1:
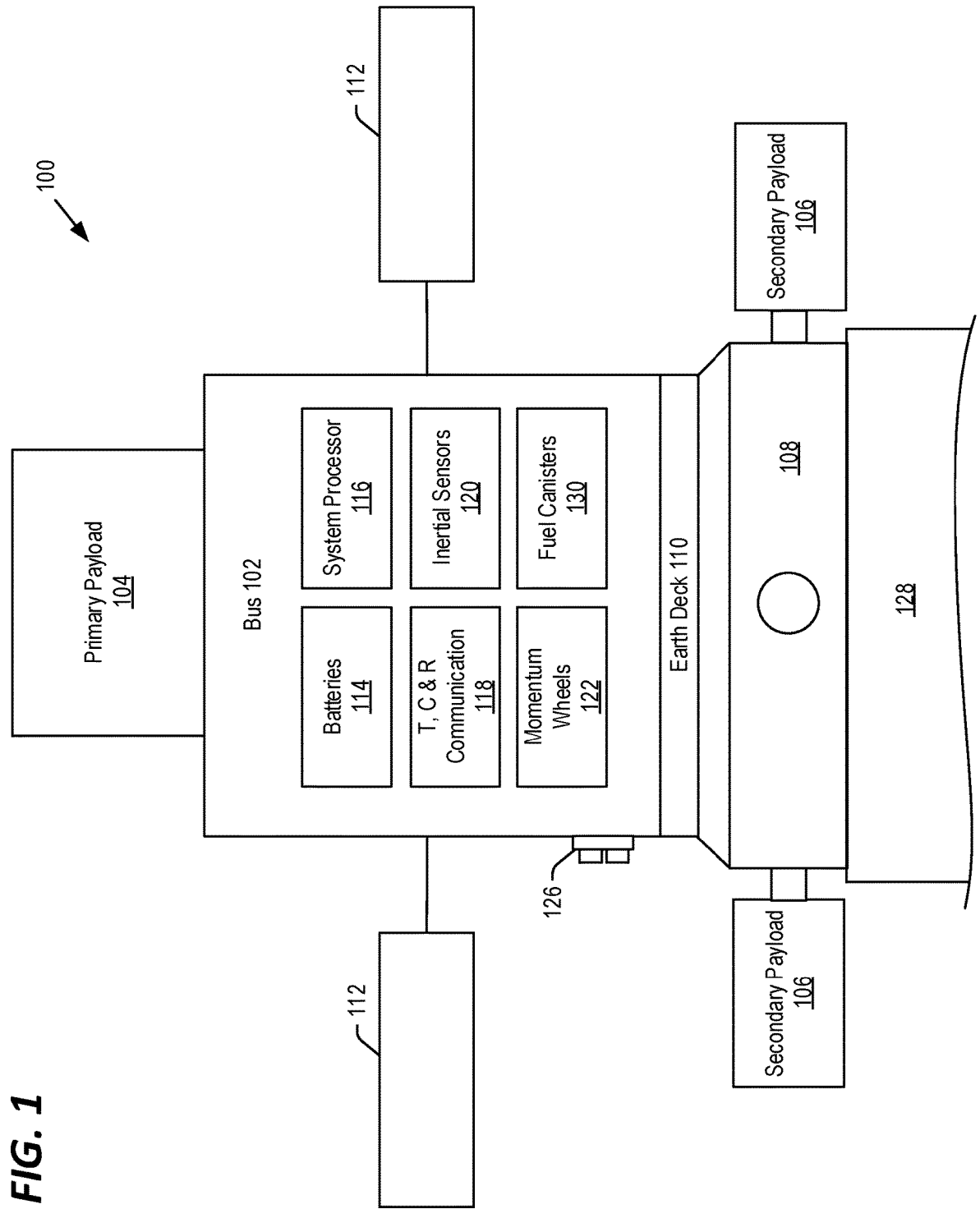
FIG. 1 is a diagram of a satellite according to embodiments of the present technology.

FIG. 1 is a high-level illustration of a satellite 100 in which the present technology may be implemented. Satellite 100 includes a bus 102 carrying a primary payload 104 and possibly one or more secondary payloads 106. The satellite may optionally operate with an ESPA (evolved expendable launch vehicle (EELV) secondary payload adapter) ring 108. In particular, the satellite 100 has features that allow it to connect to the ESPA ring 108 and transfer inertial forces to the ring 108. The number of secondary payloads 106 are shown by way of example only and may vary in further embodiments. In some embodiments, the secondary payloads 106 may be omitted entirely. The embodiment of satellite 100 shown is configured for so-called inverted flight, where the secondary payloads 106 are mounted to an earth deck 110 at launch. However, in further embodiments, the payloads may be reversed with the secondary payloads mounted at the opposite end of bus 102.

The outer housing of the bus 102 may be formed by a pair of modules, a bus module and a payload module, the construction and operation of which are explained in greater detail below. The payload module may contain several different payloads, for instance, different equipment for separate customers. Typically, for a single customer, there may be a single payload comprising of a variety of equipment components.

Bus 102 may further include a variety of components for the operation of satellite 100, several of which are shown schematically in FIG. 1. Many of these components are explained in greater detail below, but in general, the bus components may include solar panels 112 and one or more batteries 114 for providing power to the satellite components. The bus 102 may further include a system processor 116 and T, C & R (telemetry, commands and ranging) communication and processing equipment 118. Bus 102 may further include inertial sensors 120 and momentum wheels 122. Inertial sensors 120 are used to determine the position and three-axis orientation of satellite 100, and momentum wheels 122 may be used for three-axis control of the orientation of the satellite 100, based on feedback from the inertial sensors 120. The particular components described herein in bus 102 are by way of example only, and not critical to the present technology. However, these and/or other components generate heat, which heat is dissipated by portions of the bus housing as explained below.

Bus 102 may further include thrusters 126 included on a side panel of the bus as explained in greater detail below. Once brought to its initial or final orbit by a rocket 128 (a portion of which is shown in FIG. 1), the satellite 100 disengages from the rocket 128. If not the final orbit, the booms 124 and thrusters 126 may be used to move and orient the satellite 100 to its final orbital location. In embodiments, the bus 102 may have a relatively small size, such as for example 1 m$^3$, particularly suited to near-Earth orbits. However, the bus 102 may be larger or smaller than that in further embodiments. Bus 102 may further include fuel canisters 130 for powering the thrusters.

Figure 2:
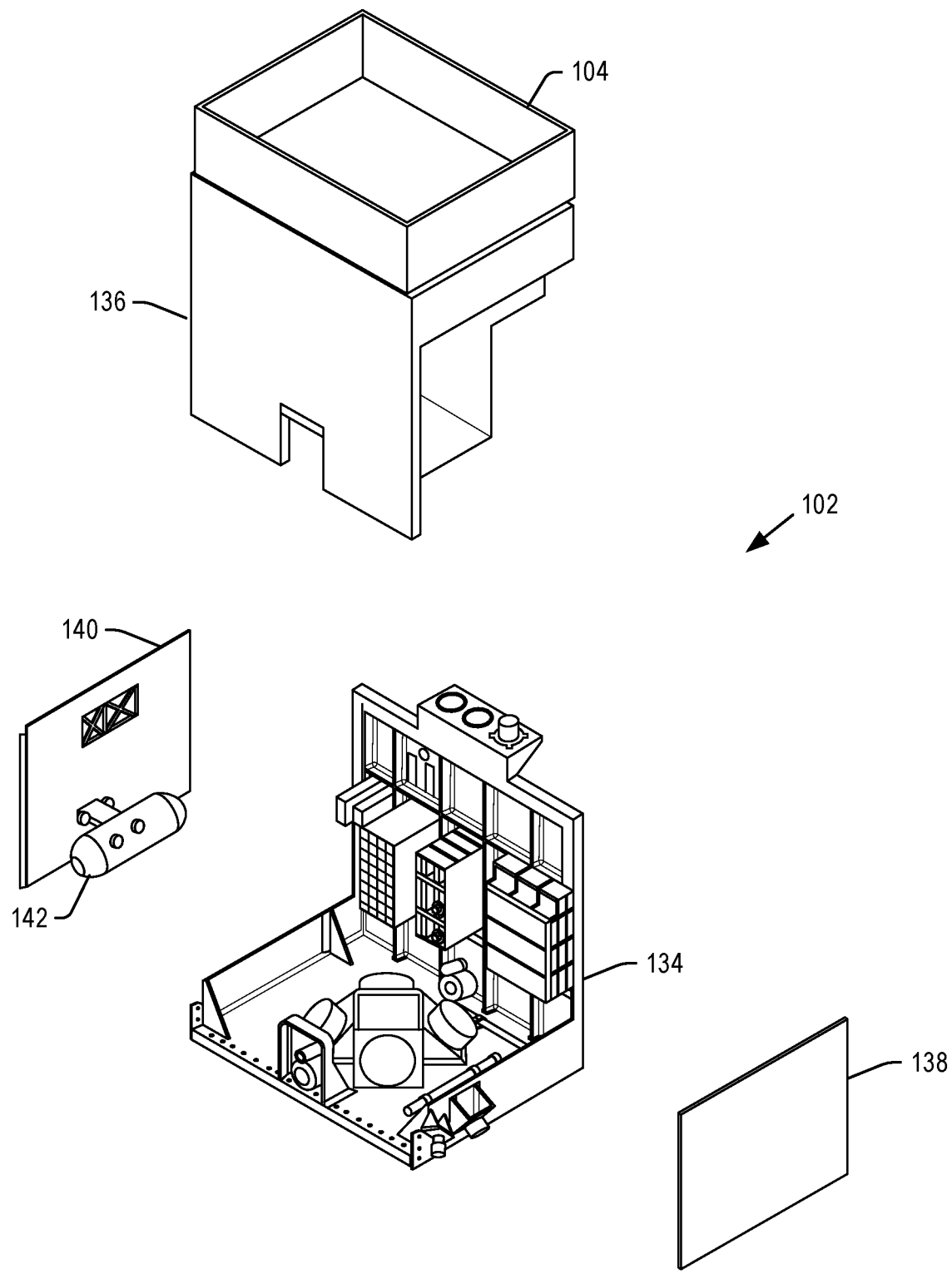
FIG. 2 is an exploded perspective views of a satellite bus according to embodiments of the present technology.
Figure 3:
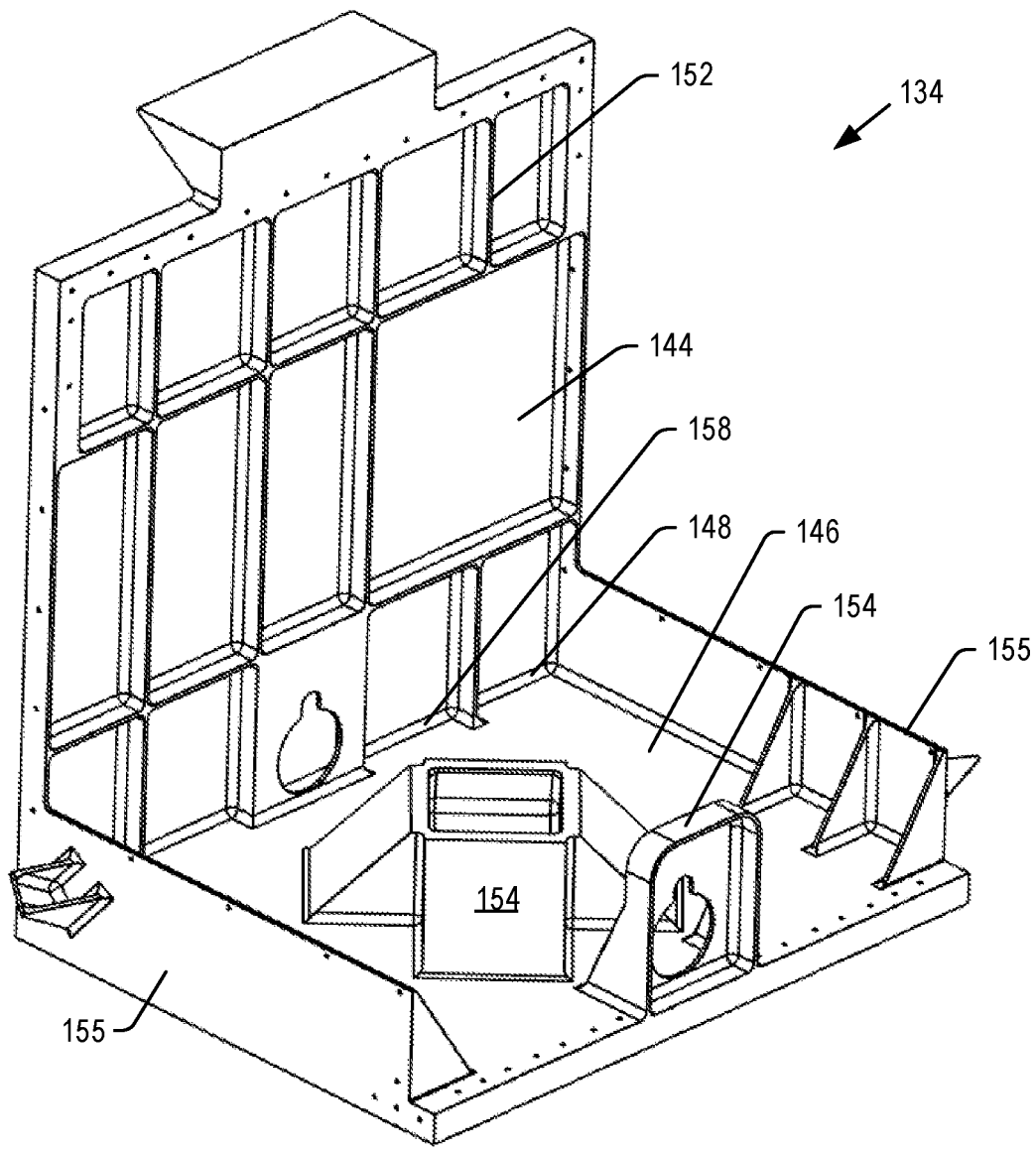
FIGS. 3-5 are different perspective views of a bus module according to embodiments of the present technology.
Figure 4:
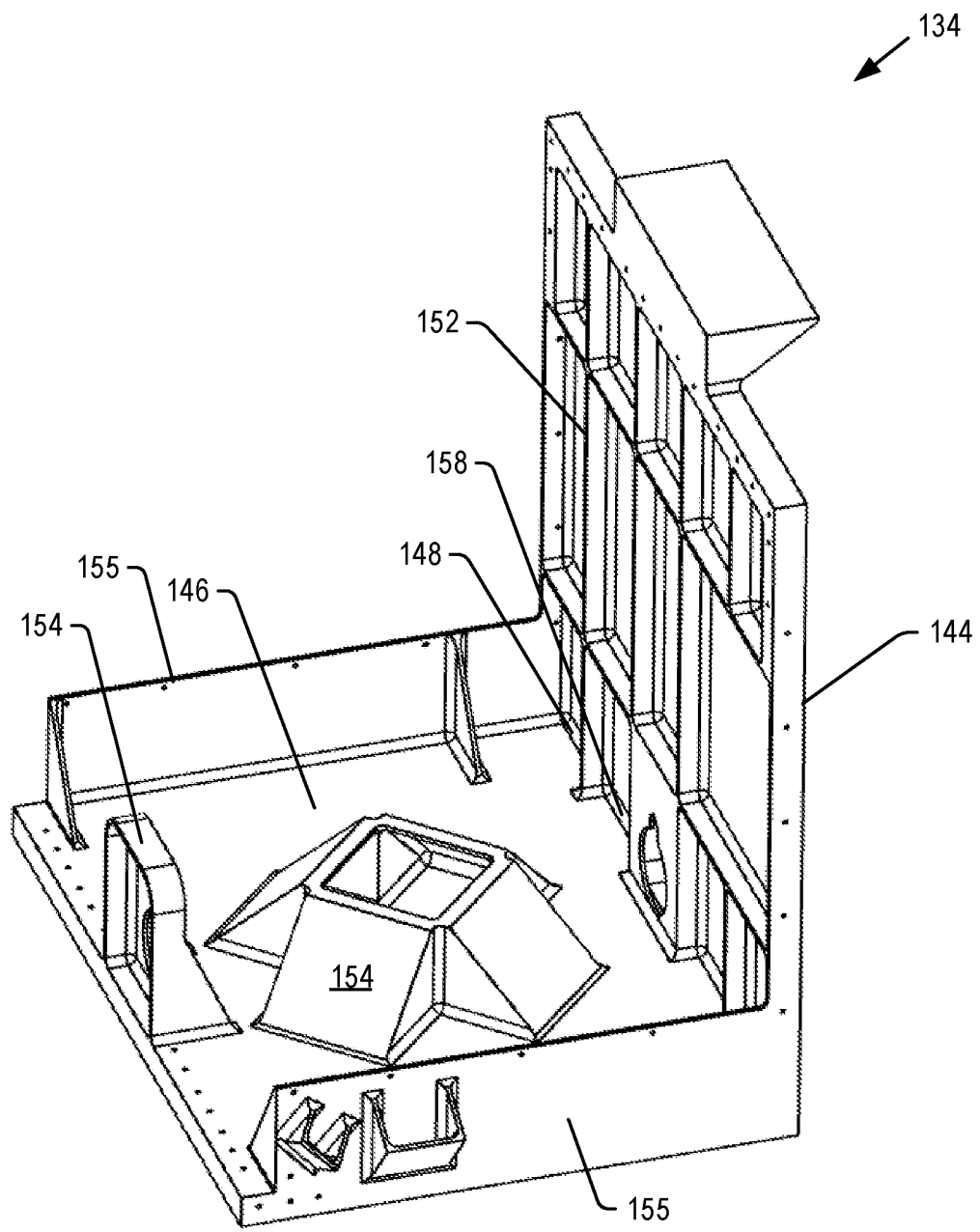

FIG. 2 is an exploded perspective view of the bus 102 showing the components making up the outer housing of bus 102. In particular, bus 102 may include a bus module 134, a payload module 136, and side closeout panels 138, 140. As noted above, a thruster 126 may be affixed to the side panel 140 for navigational course corrections of the satellite 100 when in orbit. The modules 134, 136 and side closeout panels 138, 140 may fit together to form a generally cube shape outer housing to bus 102 as shown for example in FIG. 10 explained below. A payload 104 is schematically shown supported on a surface of the payload module 136.

Figure 5:
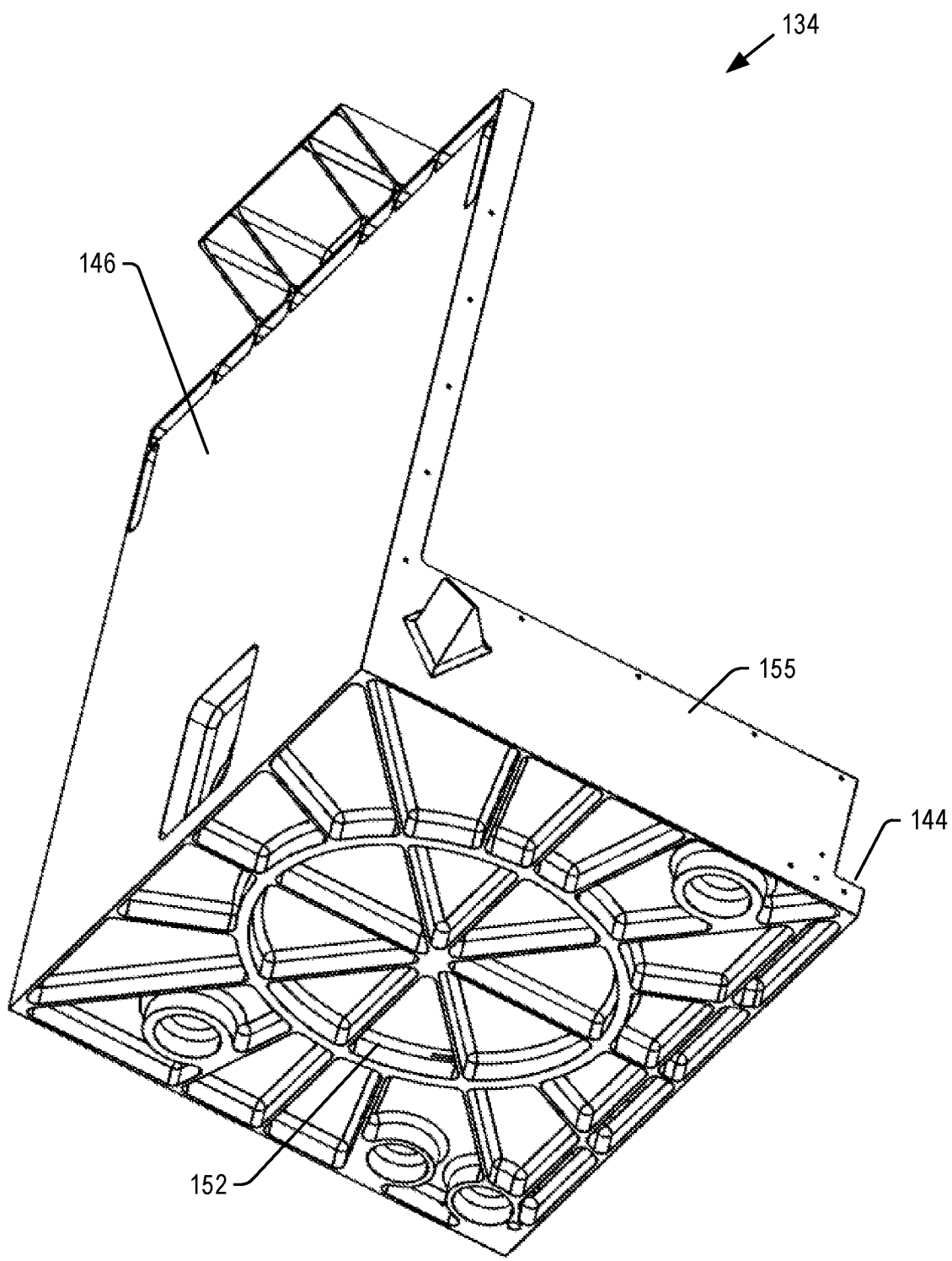

FIGS. 3-6 are views of the bus module 134 from different perspectives. In accordance with aspects of the present technology, bus module 134 includes a first panel 144 integrally formed with a second panel 146. The panels 144 and 146 come together at an interface 148 at an angle which in embodiments may be 90°. Other non-straight angles greater than or lesser than 90° are possible. A straight-angle as used herein would be the two panels extending 180° in a straight line from each other. The panels 144 and/or 146 may include structural ribs 152 adding strength and rigidity to panels 144, 146, and mounting structures 154 for mounting components as explained below. FIG. 5 is a perspective view showing a bottom of panel 146 including an arrangement of structural ribs 152. Some of ribs 152 may be arranged in a ring to facilitate connection of an ESPA ring. However, the number, position and type of structural ribs 152 and mounting structures 154 is by way of example only, and each may vary in further embodiments. Side sections 155 may be provided on panel 146 for mounting to side closeout panels to complete the outer housing of the bus 102 as explained below.

In embodiments, the bus module 134 including panels 144, 146, structural ribs 152, mounting structures 154 and side panels 155 may be integrally formed as a single structure with an "L"-shape cross-section in a casting process. It is understood that bus module 134 may be formed as a single integral structure by other fabrication methods such as for example additive manufacturing. In embodiments, the bus module 134 may be made of commercial-grade materials including Aluminum, though they may be made of other materials in alternative embodiments. In further embodiments, panels 144 and 146 may be integrally formed as a single structure, and thereafter components such as mounting structures 154 may be mounted onto one of the panels 144, 146.

Figure 6:
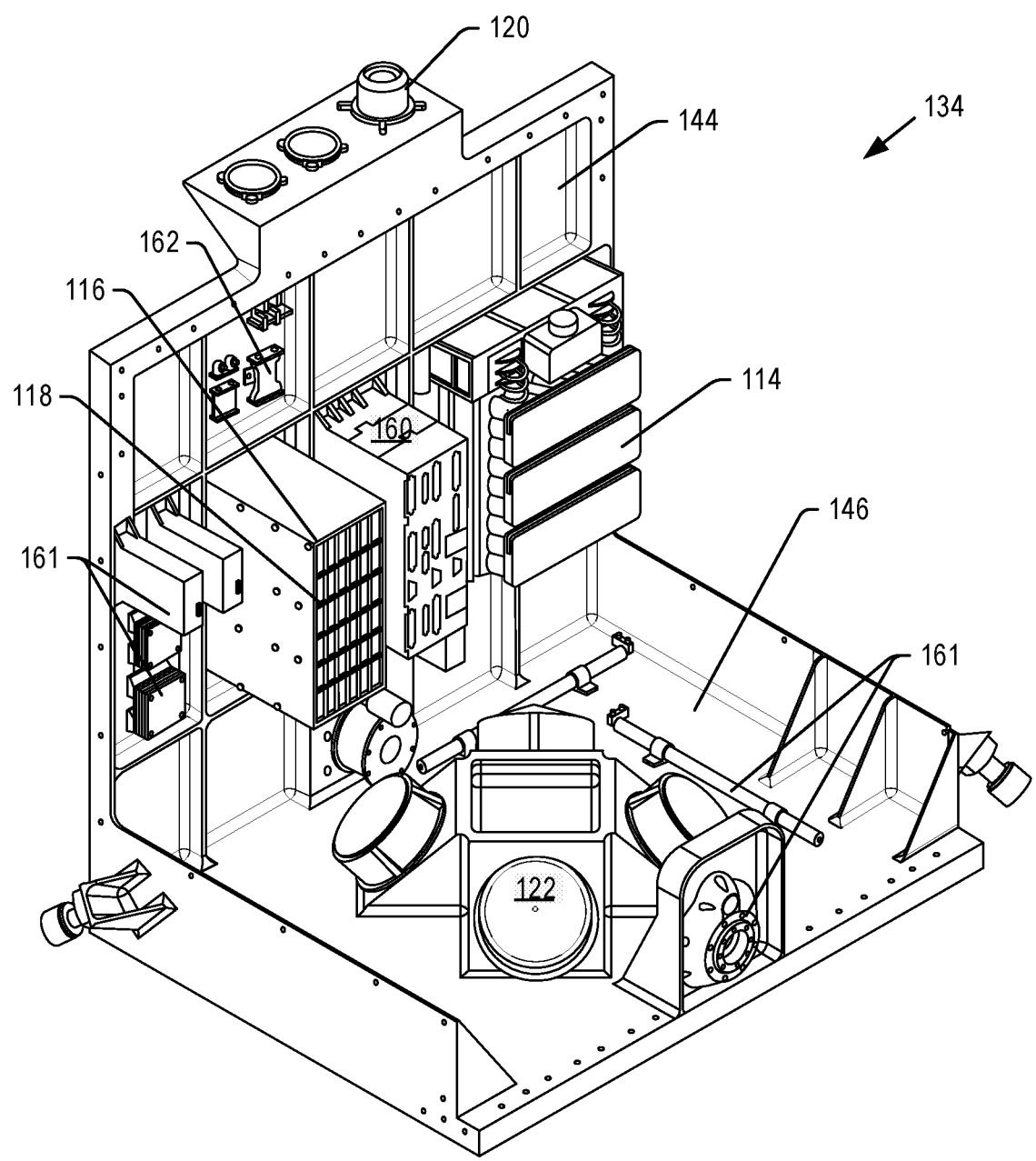
FIG. 6 is a perspective view of a bus module with components and electronics according to embodiments of the present technology.

FIG. 6 is a perspective view of bus module 134 including components mounted to mounting structures 154 and other portions of panels 144, 146. These components may include for example the system processor 116 and T, C & R communication and processing equipment 118. The T, C & R communication and processing equipment 118 may include communication and processing equipment for telemetry, commands from the ground to the satellite and ranging to operate the satellite. System processor 116 is used to control and operate satellite 100. An operator on the ground can control satellite 100 by sending commands via T, C & R communication and processing equipment 118 to be executed by system processor 116. The components may further include batteries 114 and power distribution system 160, which together provide power to the various components of bus 102. The components may further include inertial sensors 120 and momentum wheels 122, which together provide closed loop feedback to the system processor 116 as to the orientation of bus 102 in space. The bus module 134 may include a variety of other structures 161 and electronics 162. However, all of the components, structures and electronics shown in FIG. 6 are by way of example only and further embodiments may have other or additional components, structures and/or electronics, depending in part on the functionality of satellite 100.

At least some of the components, structures and electronics shown in FIG. 6 generate heat during their operation. If left unmanaged, this heat can result in the overheating and failure of one or more of the satellite 100 systems. In accordance with aspects of the present technology, heat generated by the bus module components, structures and electronics may be conducted from panel 144 to panel 146, or vice versa, depending on which panel is generating more heat. This heat conduction increases the surface area available to radiate heat out into space. Moreover, it may happen that one of the panels 144, 146 is facing the sun, while the other is facing away from the sun into deep space. Heat will radiate more efficiently away from the panel 144, 146 that is facing deep space. Efficient conduction between the panels 144, 146 allows heat to conduct to the panel facing deep space, where it may then radiate away from the bus module 134.

Forming panels 144 and 146 as a single integral structure allows heat to be efficiently conducted from panel 144 to panel 146 and/or vice versa. This efficient heat transfer allows the panels 144 and 146 to conduct sufficient heat to enable the structure, components and/or electronics mounted thereon to operate within specifications without the need for heat pipes conventionally used on bus modules to conduct heat between panels of the bus module. Operating within specification here means that the structure, components and/or electronics operate without malfunctioning due to overheating. Omission of the heat pipes provides advantages in that it simplifies the fabrication of the bus module 134 resulting in a reduction in the time, cost and complexity to make the bus module 134.

In order to further facilitate heat conduction between panels 144, 146, a fillet 158 may be formed at the interface 148 between the panels 144 and 146. Fillet 158 may be a strip of material having for example a generally triangular cross-section, and which is formed at an angle such as for example 45° to both panel 144 and panel 146. The fillet 158 may for example extend along the entire interface 148 between the panels. The cross-sectional area of fillet 158 may vary, for example depending on the heat conduction needs between panels 144 and 146. The fillet 158 increases a thickness of the bus module 134 at the interface 148 to increase the area of the bus module 134 capable of conducting heat between the panels 144 and 146.

Figure 7:
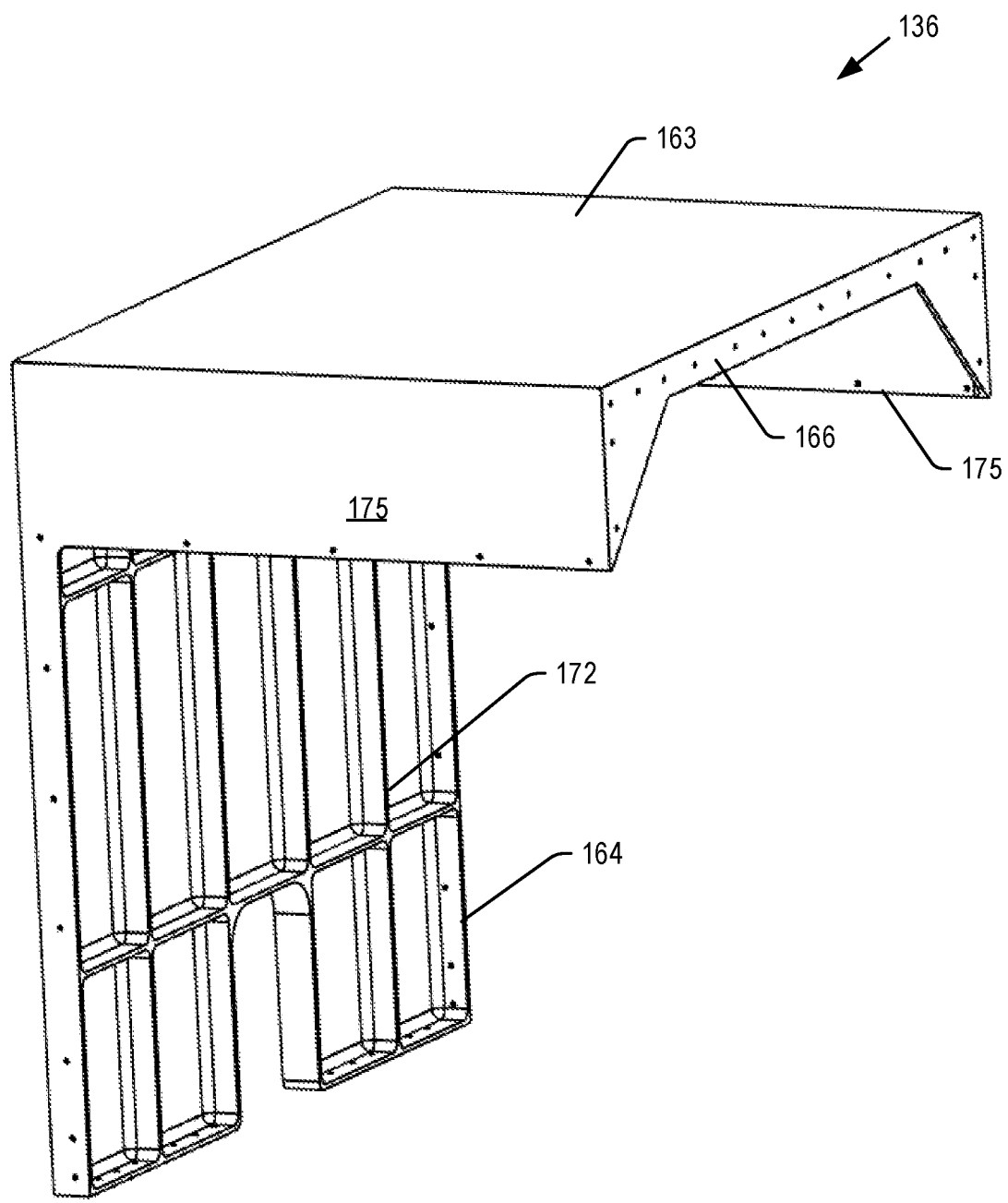
FIGS. 7-8 are different perspective views of a payload module according to embodiments of the present technology.
Figure 8:
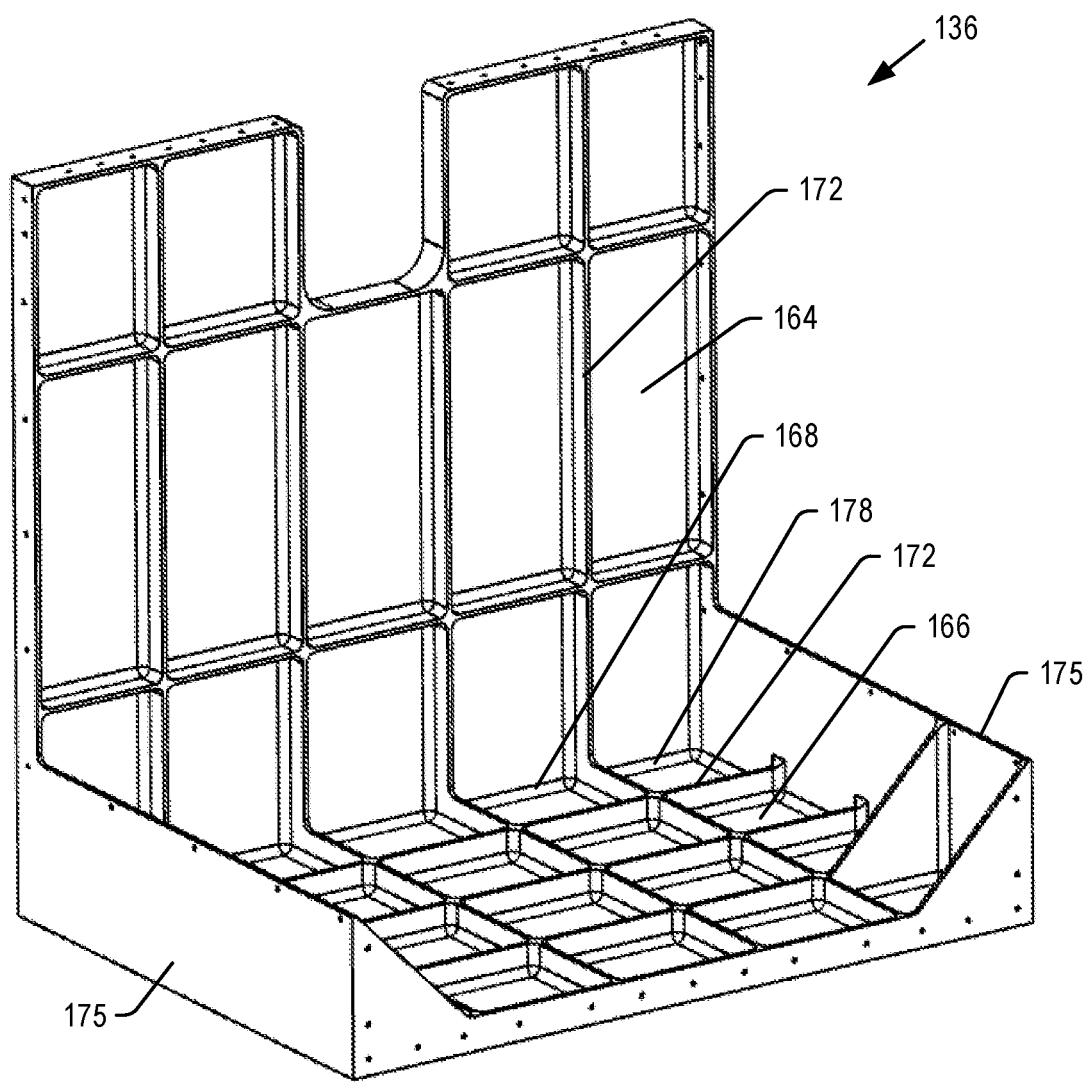
Figure 9:
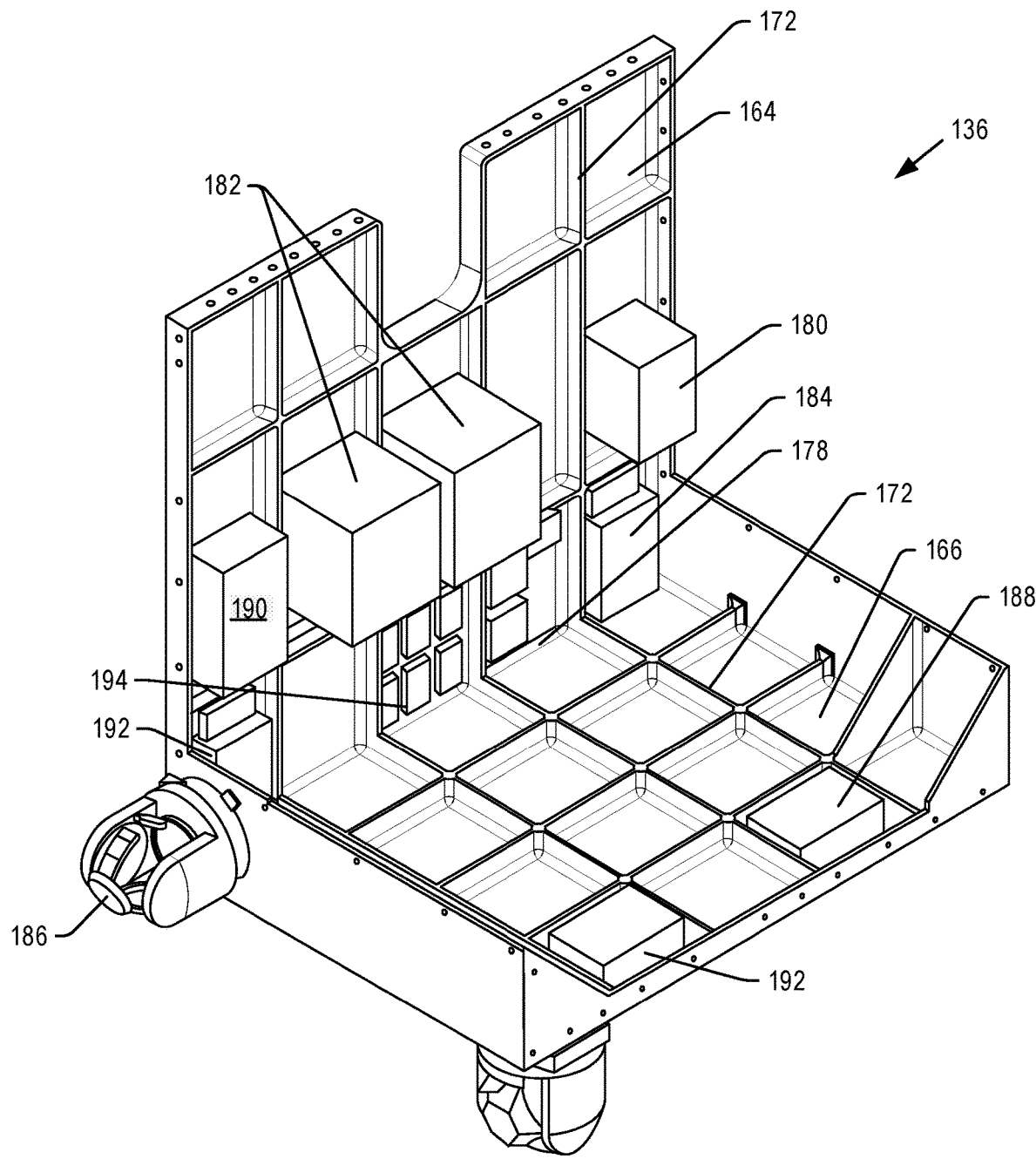
FIG. 9 is a perspective view of a payload module with components and electronics according to embodiments of the present technology.

FIGS. 7-9 are views of the payload module 136 from different perspectives. The payload module is so-named because it has a surface 163 for supporting a payload 104 as explained herein. In FIG. 7, the payload module 136 is shown in a position for mating with the bus module 134 as explained below. In FIGS. 8 and 9, the payload module 136 is shown inverted for clarity. In accordance with aspects of the present technology, payload module 136 includes a first panel 164 integrally formed with a second panel 166. The panels 164 and 166 come together at an interface 168 (FIG. 8) at an angle which in embodiments may be 90°. Other non-straight angles greater than or lesser than 90° are possible. The panels 164 and/or 166 may include structural ribs 172 adding strength and rigidity to panels 164, 166. The number, position and type of structural ribs 172 is by way of example only, and each may vary in further embodiments. Side sections 175 may be provided on panel 166 for mounting to side closeout panels to complete the outer housing of the bus 102 as explained below.

In embodiments, the payload module 136 including panels 164, 166 and structural ribs 172 may be integrally formed as a single structure with an "L"-shape cross-section in a casting process. It is understood that payload module 136 may be formed as a single integral structure by other fabrication methods such as for example additive manufacturing. In embodiments, the payload module 136 may be made of aerospace-grade materials including Aluminum and Titanium, though they may be made of other materials in alternative embodiments.

FIG. 9 is a perspective view of payload module 136 including components mounted to panels 164, 166. These components may include for example a payload processor 180 and antenna transmitters/receivers 182 which together with each other and possibly payload 104 on surface 163 control communications to/from the satellite 100. The components may further include a modem 184, communications link(s) 186 and router 188, all of which aid in communications to/from satellite 100 and communications between different components within the satellite 100 including payload 104. A power conditioner 190 may further be provided for transforming voltages received from batteries 114 to the appropriate voltage(s) for use by the components in the payload bus 136 and/or payload 104. The payload module 136 may include a variety of other structures 192 and electronics 194. However, all of the components, structures and electronics shown in FIG. 9 are by way of example only and further embodiments may have other or additional components, structures and/or electronics, depending in part on the payload 104 carried by satellite 100 and/or the functionality of satellite 100.

At least some of the components, structures and electronics shown in FIG. 9 generate heat during their operation. If left unmanaged, this heat can result in the overheating and failure of one or more of the payload 104 systems and/or satellite 100 systems. In accordance with aspects of the present technology, heat generated by the payload module components, structures and electronics may be conducted from panel 164 to panel 166, or vice versa, depending on which panel is generating more heat. This heat conduction increases the surface area available to radiate heat out into space. Moreover, it may happen that one of the panels 164, 166 is facing the sun, while the other is facing away from the sun into deep space. As noted above with respect to the panels of the bus module 134, heat will radiate more efficiently away from the panel 164, 166 that is facing deep space. Efficient conduction between the panels 164, 166 allows heat to conduct to the panel facing deep space, where it may then radiate away from the payload module 136.

Forming panels 164 and 166 as a single integral structure allows heat to be efficiently conducted from panel 164 to panel 166 and/or vice versa. This efficient heat transfer allows the panels 164 and 166 to conduct sufficient heat to enable the structure, components and/or electronics mounted thereon to operate within specifications without the need for heat pipes conventionally used on bus modules to conduct heat between panels of the bus module. Omission of the heat pipes provides advantages in that it simplifies the fabrication of the payload module 136 resulting in a reduction in the time, cost and complexity to make the payload module 136.

In order to further facilitate heat conduction between panels 164, 166, a fillet 178 (FIGS. 8 and 9) may be formed at the interface 168 between the panels 164 and 166. Fillet 178 may be a strip of material having for example a generally triangular cross-section, and which is formed at an angle such as for example 45° to both panel 164 and panel 166. The fillet 178 may for example extend along the entire interface 168 between the panels. The cross-sectional area of fillet 178 may vary, for example depending on the heat conduction needs between panels 164 and 166. The fillet 178 increases a thickness of the payload module 136 at the interface 168 to increase the area of the payload module 136 capable of conducting heat between the panels 164 and 166.

Figure 10:
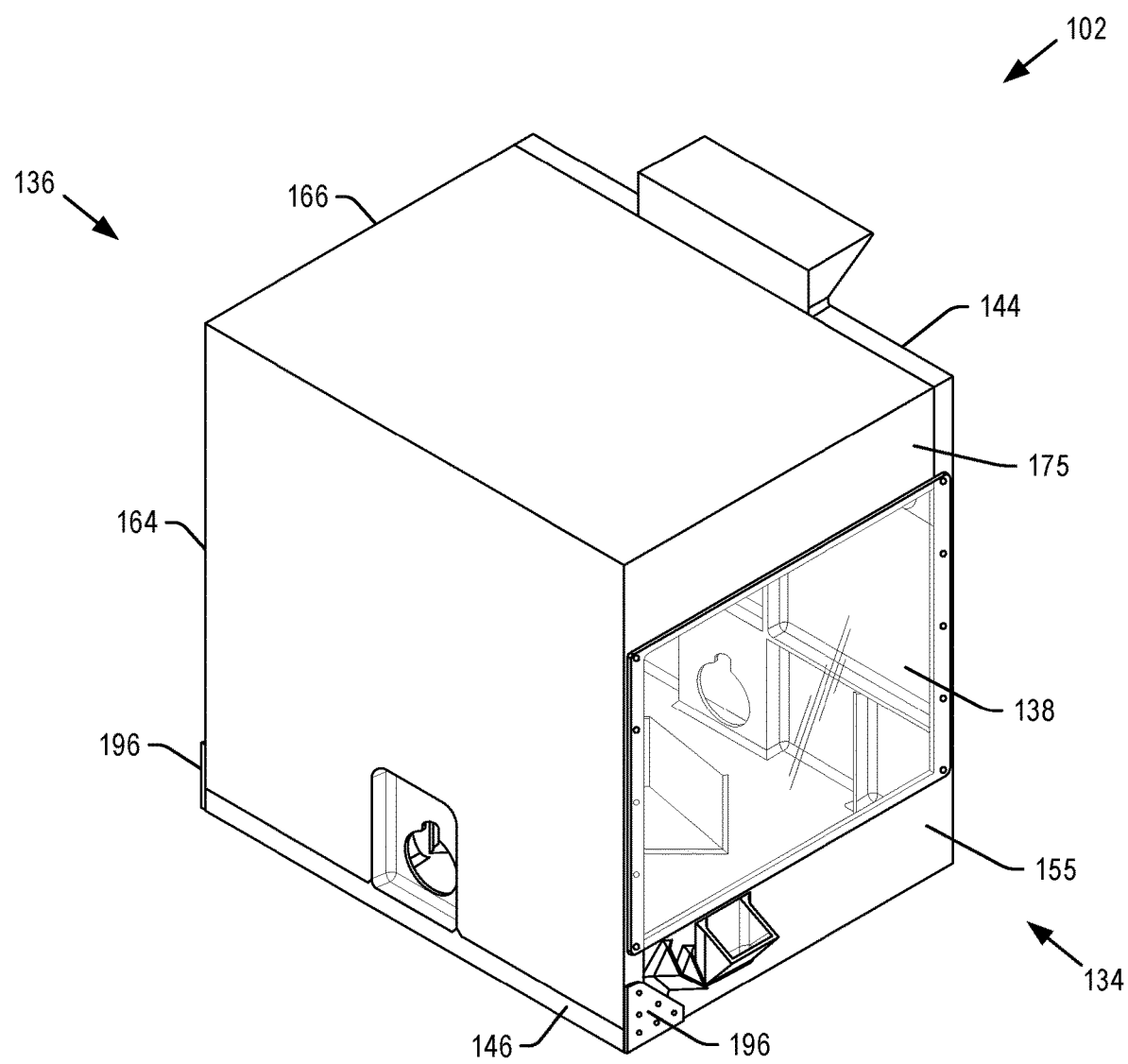
FIG. 10 is a perspective view of a completed bus including assembled bus module and payload module according to embodiments of the present technology.

FIG. 10 is a perspective view showing a fully assembled bus 102 including the bus module 134 bolted or otherwise fastened to the payload module 136. The panels 144, 146 of the bus module 134 and the panels 164, 166 of the payload module 136 make up four sides of the assembled bus 102. As noted above, the remaining two sides may be sealed by side closeout panels 138 and 140 (only panel 138 is visible in FIG. 10; panel 140 is shown in the exploded perspective view of FIG. 2). Side closeout panels 138, 140 may be bolted or otherwise fastened to panels 144, 146, 164 and 166. As noted above, panels 146 and 166 include side sections 155, 175, respectively, extending up from panels 146 and 166. The side closeout panels 138, 140 may be bolted to the side sections 155, 175 of the panels 146 and 166.

The panels 144, 146 of bus module 134 may be slightly longer than the panels 164, 166 of the payload module so that the out surfaces of panels 164, 166 are flush with the edges of panels 144, 146 when the modules 134, 136 are affixed to each other as shown in FIG. 10. It is understood that the modules 134 and 136 may have different sizes to fit together in further embodiments. In examples, mounting plates 196 may be provided which bolt to both the bus module 134 and the payload module 136 to further secure the modules to each other.

In the past, satellites have been large and customized for one-off production based on the needs and functionality of the individual satellite. However, more recently, satellites such as the satellite 100 of the present technology may be one of many such satellites, for example for use in a constellation network of satellites. In such a system, which may employ tens or hundreds of such satellites, production efficiencies become much more important than in one-off satellites. Thus, the reduction in time, cost and complexity of the present technology, which enables omission of heat pipes, becomes significant. It is a further advantage of the present technology to provide the ability to build up completed bus modules and payload modules and join them together later in the integration process. This allows a standardized bus production line, and a customized payload production line that do not interfere with each other.

Unlike larger, high-orbit customized satellites, the constellation satellite 100 is susceptible to mass production. The present technology simplifies the mass production of satellites 100. In particular, the bus module may typically include most or all of the same components, while the components of the payload module may vary significantly from satellite to satellite. The satellite 100 of the present technology may be fabricated by building the integrated panel bus module with all its components in a standardized process (possibly a mass production process) and building the integrated panel payload module with all its components in a second, customized process independent of the bus module production process. Once the bus module is complete and the payload module is complete, the modules may be brought together and affixed as described above. As each of the bus module and payload module production processes are independent of each other, the respective processes do not interfere with each other. Forming the modules of single, integrated "L"-shaped panels further simplifies the respective processes. This is especially true in production of the bus module, which can be standardized in a mass production process. Integrating the panels of the bus module together will result in a cost and production savings which can become significant in a mass production operation.

Moreover, the fabrication process (casting, additive manufacturing, etc.) allows for strength vs. mass optimization via a design process called "topology optimization" where the designer can precisely determine where material is needed to satisfy thermal and structural requirements of each "L"-shaped panel as a single integrated whole. This process allows for optimal mass distribution to maximize thermal conductivity between the adjacent panels of each of the bus module 134 and payload module 136.

In embodiments described above, both the bus module 134 and the payload module 136 include "L"-shaped panels integrally cast or otherwise formed as a single structure. However, in further embodiments, only one of the bus module 134 and the payload module 136 may be formed as a single structure, with the other of the bus and payload modules being formed of conventional bolted panels.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A bus for a satellite, comprising:
   a bus module, and
   a payload module, at least one of the bus module and the payload module comprising first and second panels integrally formed with each other at a non-straight angle to each other, the bus module and payload module configured to mate with each other to form sides of the bus, one or more of the first and second panels comprising structure, components or electronics generating heat, the integral formation of the first and second panels facilitating heat conduction between the first and second panels;
   a fillet formed at an interface where the first and second panels come together, the fillet increasing a thickness at the interface to increase the area available to conduct heat between the first and second panels; and
   first and second side closeout panels which together with the bus module and payload module form an outer housing of the bus.

2. The bus of claim 1, wherein one of the bus module and the payload module comprise the first and second integrally formed panels and the other of the bus module and the payload module comprise third and fourth panels integrally formed with each other at a non-straight angle to each other, the integral formation of the third and fourth panels facilitating heat conduction between the third and fourth panels.

3. The bus of claim 1, wherein the first and second panels are at 90° to each other.

4. The bus of claim 1, further comprising side sections on either side of the second panel to which the first and second side closeout panels are affixed.

5. The bus of claim 1, wherein the first and second panels are formed by casting or additive manufacturing.

6. The bus of claim 1, wherein the first and second panels conduct sufficient heat to enable the structure, components or electronics to operate within specifications without the need for heat pipes affixed between the first and second panels.

7. A bus for a satellite, comprising:
   a bus module comprising first and second panels integrally formed with each other at a non-straight angle to each other;
   a payload module comprising third and fourth panels integrally formed with each other at a non-straight angle to each other, the bus module and payload module configured to mate with each other to form sides of the bus, one or more of the first, second, third and fourth panels comprising structure, components or electronics generating heat, the integral formation of the first and second panels facilitating heat conduction between the first and second panels, and the integral formation of the third and fourth panels facilitating heat conduction between the third and fourth panels;
   a first fillet formed at a first interface where the first and second panels come together, the first fillet increasing a thickness of the bus module at the first interface to increase an area of the bus module available to conduct heat between the first and second panels; and
   a second fillet formed at a second interface where the third and fourth panels come together, the second fillet increasing a thickness of the payload module at the second interface to increase an area of the payload module available to conduct heat between the third and fourth panels.

8. The bus of claim 7, further comprising first and second side closeout panels which together with the bus module and payload module form a cubic housing for the bus.

9. The bus of claim 8, further comprising first and second side sections on either side of the first panel to which the first and second side closeout panels are affixed.

10. The bus of claim 9, further comprising third and fourth side sections on either side of the third panel to which the first and second side closeout panels are affixed.

11. The bus of claim 7, wherein the first and second panels are formed by casting or additive manufacturing.

12. The bus of claim 7, wherein the first and second panels conduct sufficient heat to enable the structure, components or electronics to operate within specifications without the need for heat pipes affixed between the first and second panels.

* * * * *